US011096214B2

(12) United States Patent
Gulati et al.

(10) Patent No.: US 11,096,214 B2
(45) Date of Patent: Aug. 17, 2021

(54) DISTRIBUTED CHANNEL ACCESS MECHANISM USING MULTIPLE ACCESS SIGNATURES FOR CONTROL TRANSMISSIONS

(71) Applicant: QUALCOMM Incorporated, San Diego, CA (US)

(72) Inventors: Kapil Gulati, Hillsborough, NJ (US); Junyi Li, Chester, NJ (US); Naga Bhushan, San Diego, CA (US); Sudhir Kumar Baghel, Hillsborough, NJ (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/525,180

(22) Filed: Jul. 29, 2019

(65) Prior Publication Data
US 2020/0053770 A1 Feb. 13, 2020

Related U.S. Application Data

(60) Provisional application No. 62/717,364, filed on Aug. 10, 2018.

(51) Int. Cl.
*H04W 74/00* (2009.01)
*H04W 72/04* (2009.01)
(Continued)

(52) U.S. Cl.
CPC ......... *H04W 74/002* (2013.01); *H04L 5/0048* (2013.01); *H04L 5/0053* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2015/0023267 A1* 1/2015 Lim ................. H04W 72/0406
370/329
2017/0013628 A1* 1/2017 Kim .................... H04W 56/002
(Continued)

FOREIGN PATENT DOCUMENTS

WO 2018032014 A1 2/2018
WO WO 2018/032014 A1 * 2/2018 ............... H04L 5/00

OTHER PUBLICATIONS

3GPP TSG RAN WG1 #88, R1-1701625, Athens, Greece, Feb. 13-17, 2017, Title: The performance evaluation of non-orthogonal MA in eV2X, Source: ZTE, ZTE Microelectronics, Agenda item 7.2.1.4. (Year: 2017).*
International Search Report and Written Opinion—PCT/US2019/044081—ISA/EPO—dated Nov. 15, 2019.
(Continued)

*Primary Examiner* — Peter G Solinksy
*Assistant Examiner* — Sanjay K Dewan
(74) *Attorney, Agent, or Firm* — Loza & Loza, LLP

(57) ABSTRACT

Aspects of the disclosure relate to a distributed channel access mechanism using multiple access (MA) signatures for control transmissions. In one aspect, a transmitting device determines a MA signature for distinguishing a transmission of the transmitting device from another transmission of another transmitting device on a same frequency resource, transmits sidelink control information using the MA signature on a first set of frequency resources, the sidelink control information corresponding to first data information, transmits the first data information on the first set of frequency resources, and receives, from a receiving device, a response indicating whether reception of the first
(Continued)

data information was successful. Other aspects, embodiments, and features are also claimed and described.

30 Claims, 13 Drawing Sheets

(51) Int. Cl.
  H04W 72/12  (2009.01)
  H04W 72/08  (2009.01)
  H04L 5/00   (2006.01)
  H04W 4/40   (2018.01)

(52) U.S. Cl.
  CPC ..... H04W 72/0406 (2013.01); H04W 72/082 (2013.01); H04W 72/1231 (2013.01); *H04L 5/0007* (2013.01); *H04W 4/40* (2018.02)

(58) Field of Classification Search
  USPC ........................................ 370/329
  See application file for complete search history.

(56) References Cited

U.S. PATENT DOCUMENTS

| | | | |
|---|---|---|---|
| 2018/0070252 A1* | 3/2018 | Gupta | H04W 48/16 |
| 2019/0149274 A1* | 5/2019 | Freda | H04W 72/0453 |
| | | | 370/329 |
| 2019/0149311 A1* | 5/2019 | Takeda | H04W 72/0453 |
| | | | 370/329 |
| 2019/0149383 A1* | 5/2019 | Ko | H04W 72/04 |
| | | | 370/329 |

OTHER PUBLICATIONS

Zte et al., "The Performance Evaluation of Non-Orthogonal MA in eV2X", 3GPP Draft, 3GPP TSG RAN WG1 #88, R1-1701625-7. 2.1.4 Performance Eval of Non-Orthogonal MA in eV2X, 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017, Feb. 12, 2017 (Feb. 12, 2017), XP051208792, 6 Pages, Retrieved from the Internet: URL: http://www.3gpp.org/ftp/Meetings_3GPP_SYNC/RAN1/Docs/ [retrieved on Feb. 12, 2017] section 2, page 2.

* cited by examiner

DISTRIBUTED CHANNEL ACCESS MECHANISM USING MULTIPLE ACCESS SIGNATURES FOR CONTROL TRANSMISSIONS

PRIORITY CLAIM

This application claims priority to and the benefit of U.S. Provisional Patent Application No. 62/717,364 filed on Aug. 10, 2018, the entire content of which is incorporated herein by reference as if fully set forth below in its entirety and for all applicable purposes.

TECHNICAL FIELD

The technology discussed below relates generally to wireless communication systems, and more particularly, to a channel access mechanism using a multiple access (MA) signature for a control transmission.

INTRODUCTION

3rd Generation Partnership Project (3GPP) New Radio (NR) specifications (often referred to as 5G) support downlink transmissions from multiple transmission points (TRPs). In a multi-TRP transmission scheme, multiple TRPs may or may not be co-located (e.g., within a same cell). Moreover, the multiple TRPs may transmit data to the same UE. The data sent from the multiple TRPs to the same UE may be the same data or different data. When transmitting different data from the multiple TRPs, a higher throughput may be achieved. When transmitting the same data (with potentially different redundancy versions) from the multiple TRPs, transmission reliability may be improved.

Cellular vehicle-to-everything (V2X) is a vehicular communication system enabling communications between a vehicle and any entity that may affect the vehicle. V2X may incorporate other more specific types of communication, e.g., vehicle-to-infrastructure (V2I), vehicle-to-vehicle (V2V), vehicle-to-pedestrian (V2P), vehicle-to-device (V2D), and vehicle-to-grid (V2G).

In 3GPP Release 14, LTE-based communication has been defined for a direct interface (e.g., PC5 interface) as well as for a network interface (e.g., Uu interface). Currently, V2V communication via the PC5 interface is broadcast. However, for later 3GPP releases (e.g. Release 16 and beyond), there is a need to establish unicast links between vehicles for advanced use cases. A use case for 1-to-1 or 1-to-many V2V link scenarios may involve the on-demand sharing of sensor data that cannot be supported over broadcast. Another use case may involve a see-through camera feed, such as when a first vehicle wishes to see in front of a second vehicle ahead of the first vehicle using the second vehicle's camera.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a distributed channel access mechanism using multiple access (MA) signatures for control transmissions. In one aspect, a transmitting device determines a MA signature for distinguishing a transmission of the transmitting device from another transmission of another transmitting device on a same frequency resource, transmits sidelink control information using the MA signature on a first set of frequency resources, the sidelink control information corresponding to first data information, transmits the first data information on the first set of frequency resources, and receives, from a receiving device, a response indicating whether reception of the first data information was successful. In another aspect, a receiving device receives one or more sidelink control information on a first set of frequency resources from one or more transmitting devices, detects a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource, determines, for the detected MA signature, a signal-to-interference-plus-noise ratio (SINR) of first data information associated with the corresponding sidelink control information, determines a likelihood of successfully receiving the first data information based on the determined SINR, and transmits a response to the transmitting device based on the likelihood, wherein the response indicates whether reception of the first data information is successful. Other aspects, embodiments, and features are also claimed and described.

In one example, a method for channel access at a transmitting device is disclosed. The method includes determining a multiple access (MA) signature for distinguishing a transmission of the transmitting device from another transmission of another transmitting device on a same frequency resource, transmitting sidelink control information using the MA signature on a first set of frequency resources, the sidelink control information corresponding to first data information, transmitting the first data information on the first set of frequency resources, receiving, from a receiving device, a response indicating whether reception of the first data information was successful, determining second data information and a second set of frequency resources based on the response received from the receiving device, and transmitting the second data information on the second set of frequency resources.

In another example, a transmitting device for channel access is disclosed. The transmitting device includes means for determining a multiple access (MA) signature for distinguishing a transmission of the transmitting device from another transmission of another transmitting device on a same frequency resource, means for transmitting sidelink control information using the MA signature on a first set of frequency resources, the sidelink control information corresponding to first data information, means for transmitting the first data information on the first set of frequency resources, means for receiving, from a receiving device, a response indicating whether reception of the first data information was successful, means for determining second data information and a second set of frequency resources based on the response received from the receiving device, and means for transmitting the second data information on the second set of frequency resources.

In a further example, a transmitting device for channel access is disclosed. The transmitting device includes a processor, a transceiver communicatively coupled to the at least one processor, and a memory communicatively coupled to the at least one processor. The at least one processor is configured to determine a multiple access (MA) signature for distinguishing a transmission of the transmitting device from another transmission of another transmitting device on a same frequency resource, transmit sidelink control information using the MA signature on a first set of frequency resources, the sidelink control information corresponding to first data information, transmit the first data information on the first set of frequency resources, receive, from a receiving device, a response indicating whether reception of the first data information was successful, determine second data information and a second set of frequency resources based on the response received from the receiving device, and transmit the second data information on the second set of frequency resources.

In yet another example, a non-transitory computer-readable medium storing computer-executable code at a transmitting device for channel access is disclosed. The non-transitory computer-readable medium includes code for causing a computer to determine a multiple access (MA) signature for distinguishing a transmission of the transmitting device from another transmission of another transmitting device on a same frequency resource, transmit sidelink control information using the MA signature on a first set of frequency resources, the sidelink control information corresponding to first data information, transmit the first data information on the first set of frequency resources, receive, from a receiving device, a response indicating whether reception of the first data information was successful, determine second data information and a second set of frequency resources based on the response received from the receiving device, and transmit the second data information on the second set of frequency resources.

In one example, a method for channel access at a receiving device is disclosed. The method includes receiving one or more sidelink control information on a first set of frequency resources from one or more transmitting devices, detecting a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource, determining, for the detected MA signature, a signal-to-interference-plus-noise ratio (SINR) of first data information associated with the corresponding sidelink control information, determining a likelihood of successfully receiving the first data information based on the determined SINR, receiving, or attempting to receive, the first data information on the first set of frequency resources, transmitting a response to the transmitting device based on the likelihood, wherein the response indicates whether reception of the first data information is successful, and receiving second data information on a second set of frequency resources.

In another example, a receiving device for channel access is disclosed. The receiving device includes means for receiving one or more sidelink control information on a first set of frequency resources from one or more transmitting devices, means for detecting a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource, means for determining, for the detected MA signature, a signal-to-interference-plus-noise ratio (SINR) of first data information associated with the corresponding sidelink control information, means for determining a likelihood of successfully receiving the first data information based on the determined SINR, means for receiving, or attempting to receive, the first data information on the first set of frequency resources, means for transmitting a response to the transmitting device based on the likelihood, wherein the response indicates whether reception of the first data information is successful, and means for receiving second data information on a second set of frequency resources.

In a further example, a receiving device for channel access is disclosed. The receiving device includes a processor, a transceiver communicatively coupled to the at least one processor, and a memory communicatively coupled to the at least one processor. The at least one processor is configured to receive one or more sidelink control information on a first set of frequency resources from one or more transmitting devices, detect a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource, determine, for the detected MA signature, a signal-to-interference-plus-noise ratio (SINR) of first data information associated with the corresponding sidelink control information, determine a likelihood of successfully receiving the first data information based on the determined SINR, receive, or attempt to receive, the first data information on the first set of frequency resources, transmit a response to the transmitting device based on the likelihood, wherein the response indicates whether reception of the first data information is successful, and receive second data information on a second set of frequency resources.

In yet another example, a non-transitory computer-readable medium storing computer-executable code at a receiving device for channel access is disclosed. The non-transitory computer-readable medium includes code for causing a computer to receive one or more sidelink control information on a first set of frequency resources from one or more transmitting devices, detect a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource, determine, for the detected MA signature, a signal-to-interference-plus-noise ratio (SINR) of first data information associated with the corresponding sidelink control information, determine a likelihood of successfully receiving the first data information based on the determined SINR, receive, or attempt to receive, the first data information on the first set of frequency resources, transmit a response to the transmitting device based on the likelihood, wherein the response indicates whether reception of the first data information is successful, and receive second data information on a second set of frequency resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the disclosure relate to a distributed channel access mechanism using multiple access (MA) signatures for control transmissions.

Figure 1:
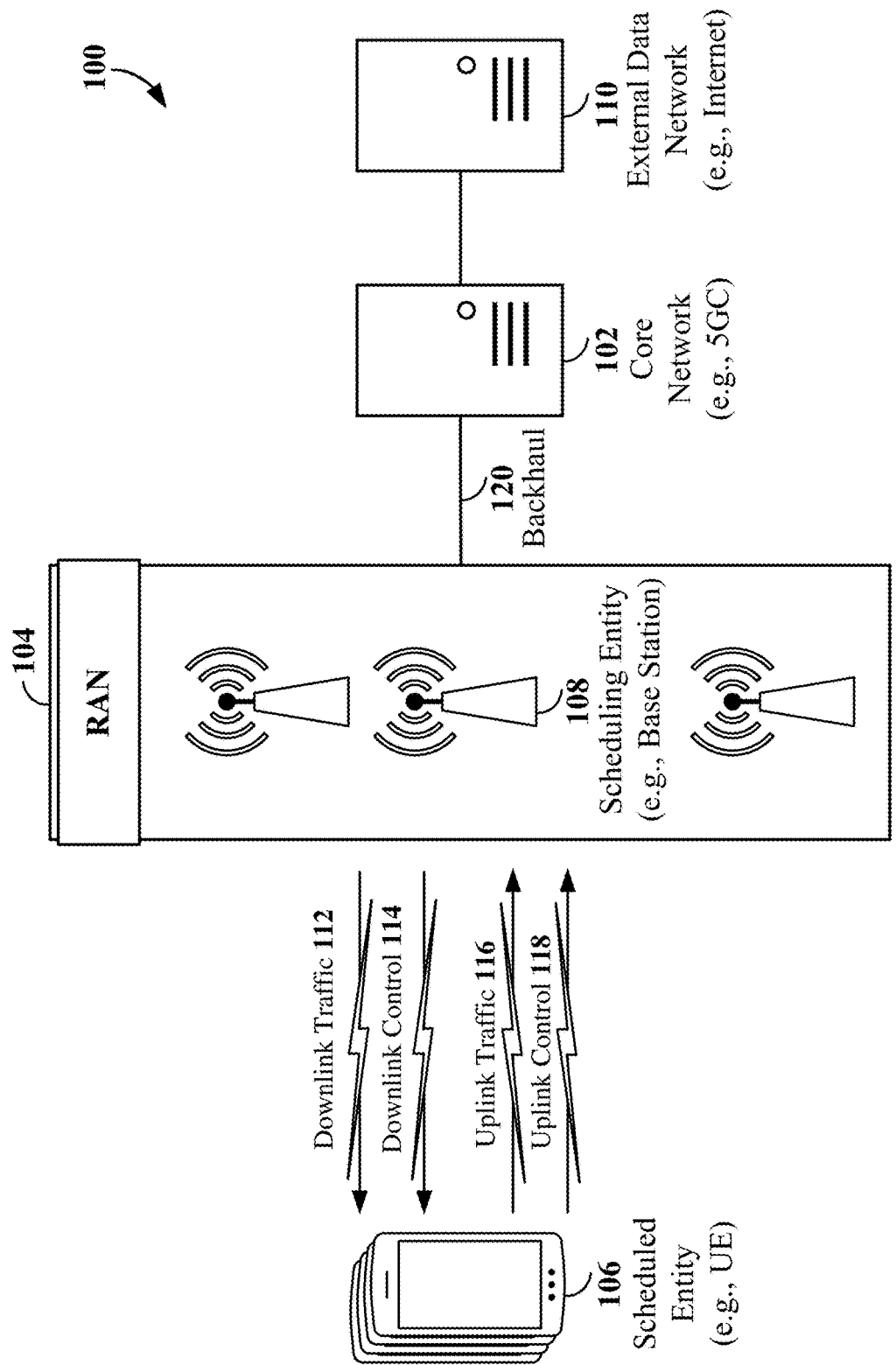
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
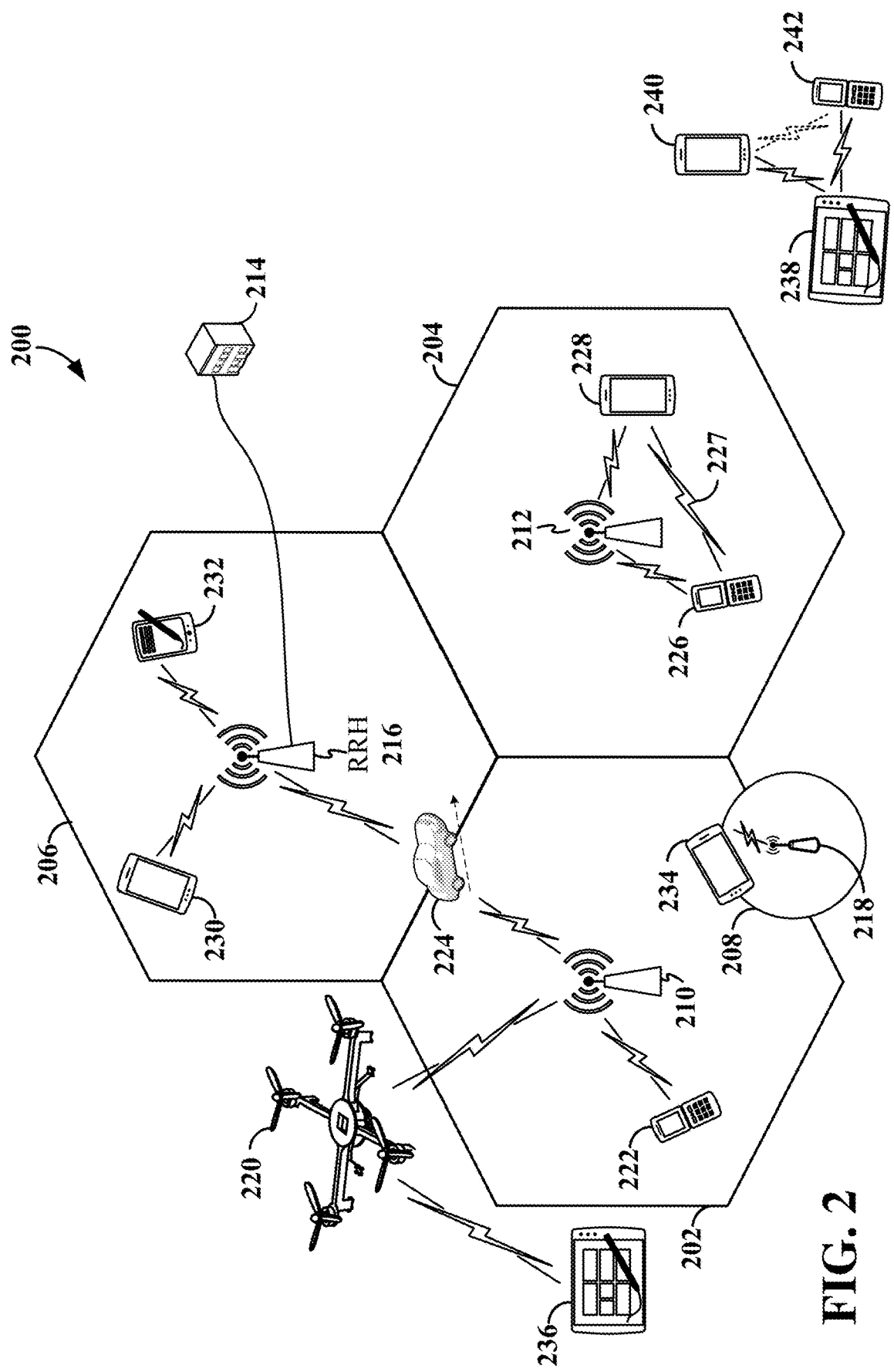
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
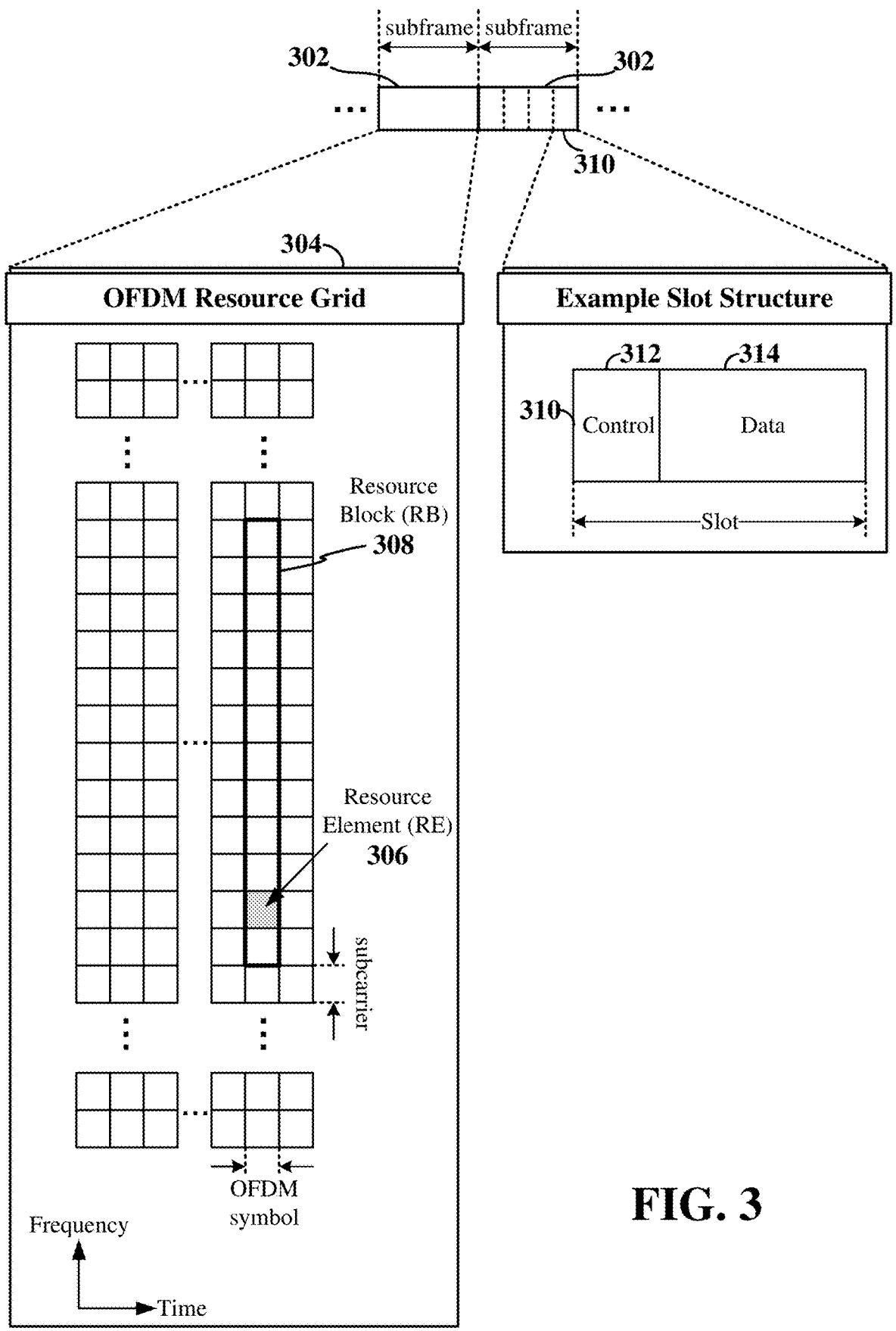
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
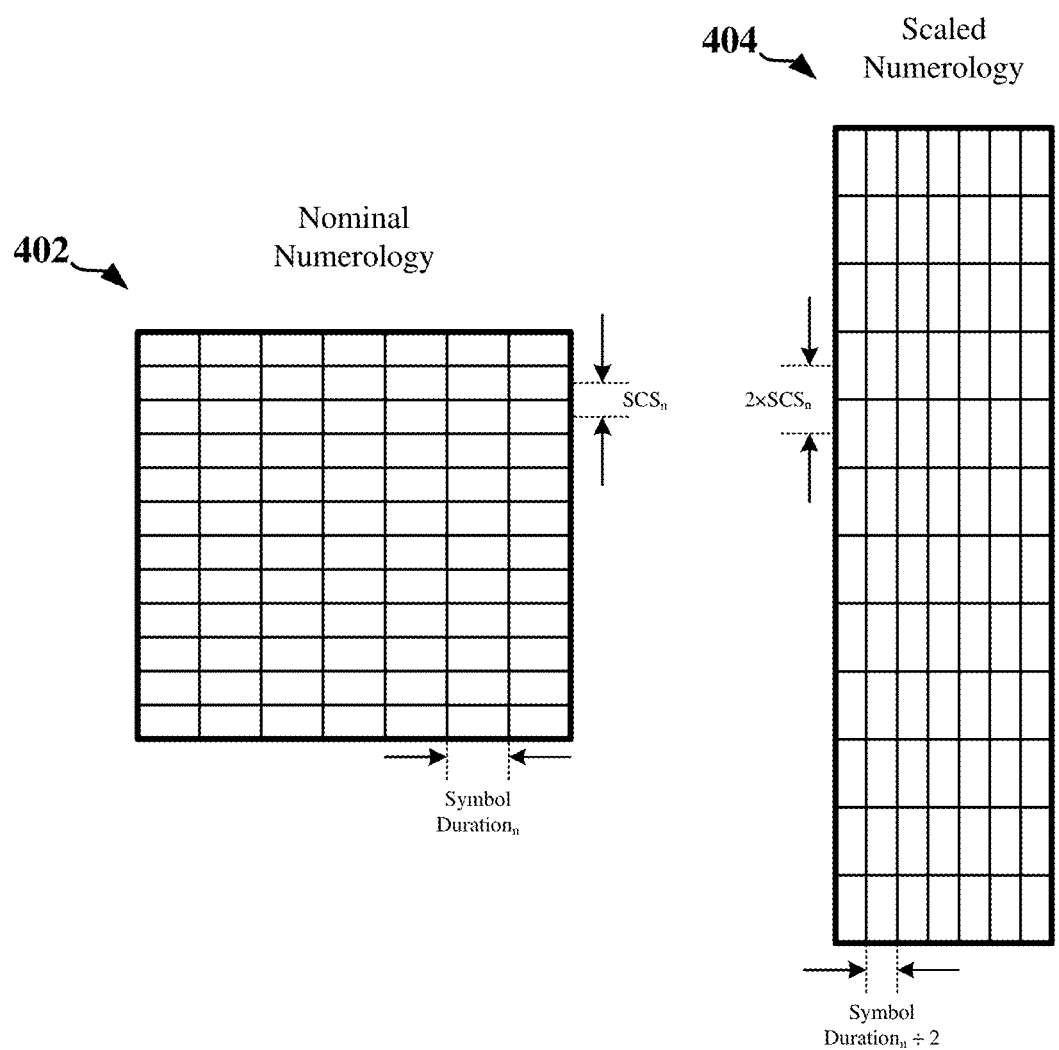
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing ($SCS_n$) of 30 kHz, and a 'nominal' symbol duration$_n$ of 333 μs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

Figure 5:
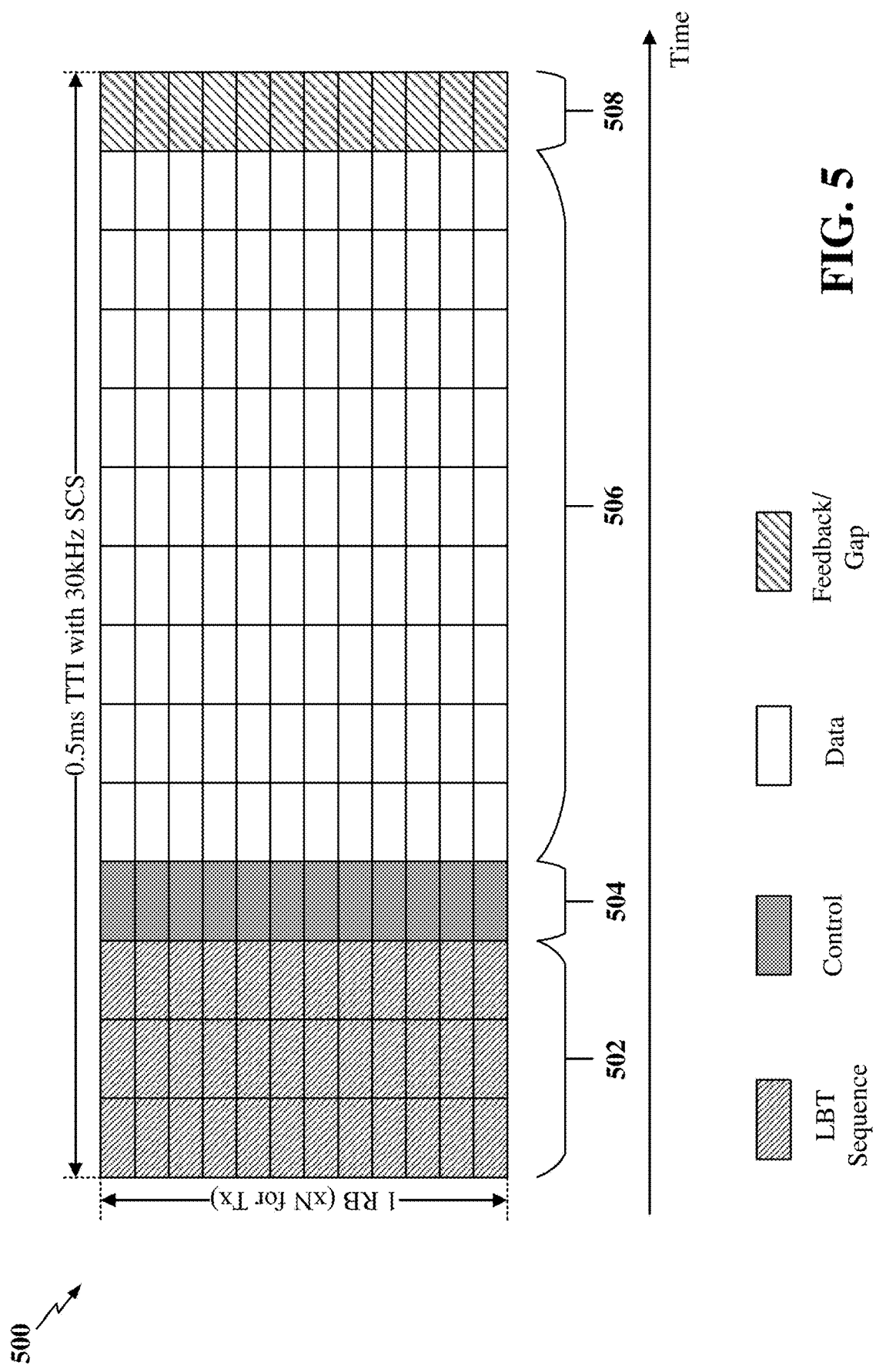
FIG. 5 illustrates a transmission time interval (TTI) structure for a Listen Before Talk (LBT)-based channel access mechanism.

In some aspects, a channel access mechanism may be based on a Listen Before Talk (LBT) contention-based design. FIG. 5 illustrates a transmission time interval (TTI) structure 500 for a LBT-based channel access mechanism, e.g., 0.5 ms TTI with 30 kHz subcarrier spacing (SCS). The TTI structure 500 may include a first region 502 having a number of LBT symbols for communicating a LBT sequence. The first region 502 is followed by a second region 504 for communicating control information. A third region 506 may include a number of symbols for communicating data. Finally, the third region 506 is followed by a feedback/gap region 508 for communicating a feedback transmission (e.g., related to a previous TTI) and facilitating a transmission/reception (Tx/Rx) turnaround. If TTI bundling is utilized, then the LBT symbols in the first region 502 may be amortized as data. Notably, some of the symbols may be vulnerable to puncturing if automatic gain control (AGC) retraining is required.

Figure 6:
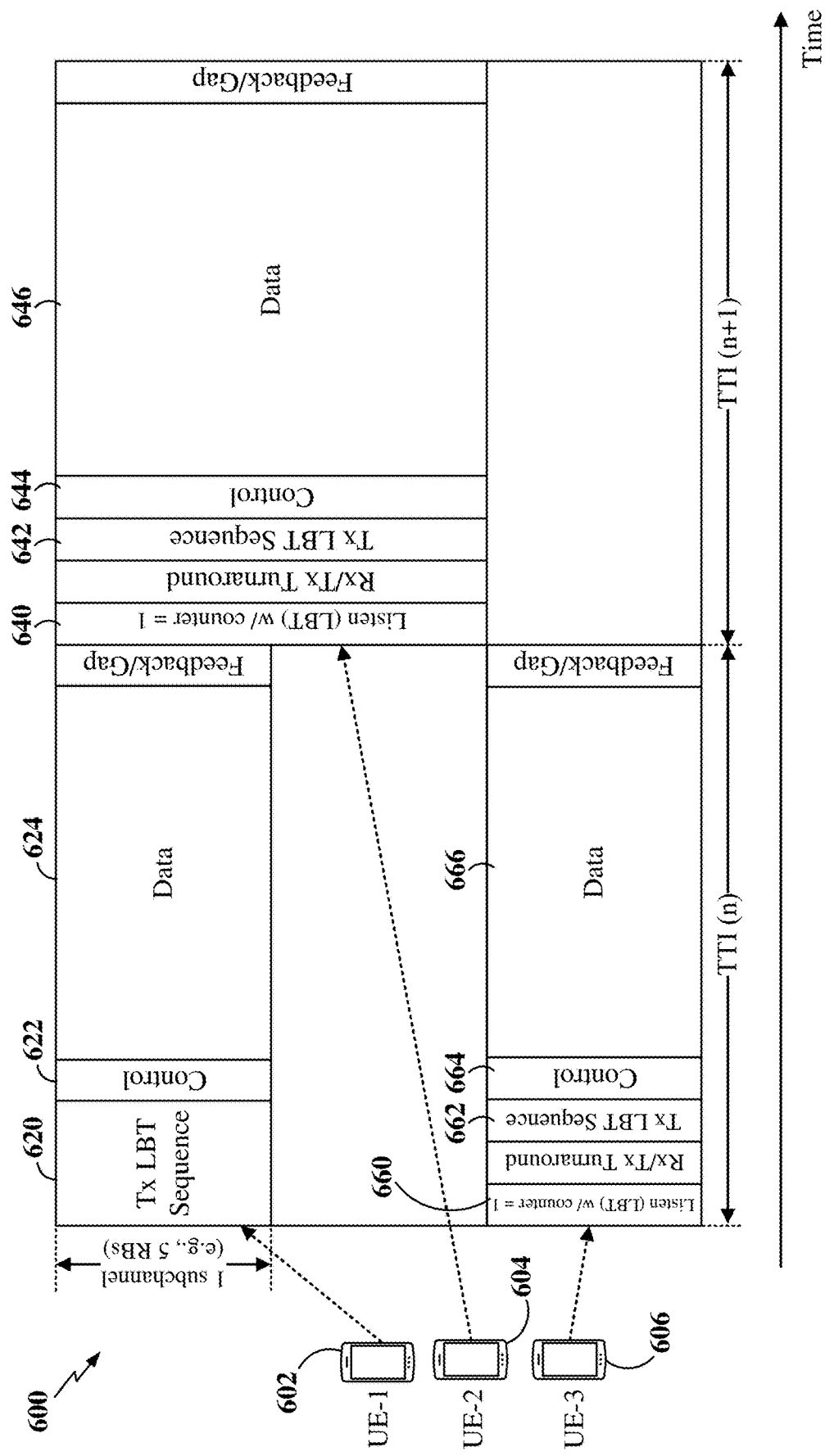
FIG. 6 illustrates use of a channel bandwidth for a channel access mechanism.

FIG. 6 illustrates use of a channel bandwidth 600 for a channel access mechanism. In an aspect, a channel bandwidth/resource pool may be divided into subchannels. For example, one subchannel may be equal to 5 resource blocks (RBs).

In an aspect, a transmitting UE may follow a LBT procedure for selecting one or more subchannels. The LBT procedure may include the transmitting UE using a counter to determine an action to execute based on a counter value (e.g., 0 or 1). Actions corresponding to the counter values may be randomly chosen or based on priority. In an example, if the counter=0, a first UE 602 may begin transmitting an LBT sequence 620 in a subchannel starting from a first symbol in a TTI. Following the LBT sequence 620, the first UE 602 may transmit control information 622 and data 624.

In another example, if the counter=1, a transmitting UE (e.g., second UE 604 or third UE 606) may listen during a first LBT symbol of a TTI to determine whether one or more subchannels are being used. The transmitting UE may then rank subchannels according to a received energy on a subchannel and select one or more unused contiguous subchannels with a lowest energy for transmission. Thereafter, following a symbol for Tx/Rx turnaround, the transmitting UE may begin transmitting an LBT sequence in one or more subchannels starting from a third symbol in a TTI. Following the LBT sequence, the transmitting UE may transmit control information and data.

As shown in FIG. 6, the second UE 604 may listen during a first LBT symbol 640 of TTI(n+1) to determine whether two contiguous subchannels are being used. If the second UE 604 detects a low energy from the two subchannels, this may indicate that the two subchannels are unused and available for transmission. Accordingly, the second UE 604 selects the two subchannels and begins transmitting an LBT sequence 642 in the two subchannels starting from a third symbol in the TTI(n+1), followed by control information 644 and data 646.

As further shown in FIG. 6, the third UE 606 may listen during a first LBT symbol 660 of TTI(n) to determine whether any subchannels are being used. If the third UE 606 detects a low energy only from one subchannel, this may indicate that only the one subchannel is unused and available for transmission. Accordingly, the third UE 606 selects the subchannel and begins transmitting an LBT sequence 662 in the subchannel starting from a third symbol in the TTI(n), followed by control information 664 and data 666.

In an aspect, the channel bandwidth 600 for the channel access mechanism may be scaled to allow for more LBT symbols. However, such scaling may increase overhead. A drawback of the channel access mechanism of FIG. 6 may be that the mechanism only provides for transmitter-side yielding. Hence, a receiver in the middle of two transmitters may have lower quality of service (QoS). Another drawback may be that the mechanism may not scale well with increasing UE densities.

Aspects of the disclosure relate to using multiple access (MA) signatures for non-orthogonal multiple access (NOMA). MA signatures are identifiers for distinguishing UE-specific patterns of data transmissions and may be used to multiplex UEs on a set of resources. NOMA uses non-orthogonal signatures. When an overloading factor of greater than 1 (>1) is present, NOMA access may support a large number of UEs. For example, the overloading factor is greater than 1 when 6 UEs are spread over 4 resource elements (REs).

In 3GPP, NOMA in downlink communications may use superposition coding, such as multi-user superposition transmission (MUST). Moreover, a receiver may be configured for successive interference cancellation (SIC). NOMA in uplink communications may utilize grant-free uplink transmissions that are power controlled. Schemes may include RSMA, SCMA, interleave-division multiple access (IDMA), pattern division multiple access (PDMA), multi-user shared access (MUSA), etc.

For V2X, a transmission may not be power controlled to a certain receiver. Hence, V2X and NOMA are different with respect to uplink communications in that different tradeoff and combination schemes are possible. In V2X, successive interference cancellation (SIC) is needed to separate transmitting UEs with a power imbalance. Moreover, V2X needs MA signatures to separate transmitting UEs that cannot be separated with SIC. Notably, power-domain MA schemes are not applicable for V2X.

Figure 7:
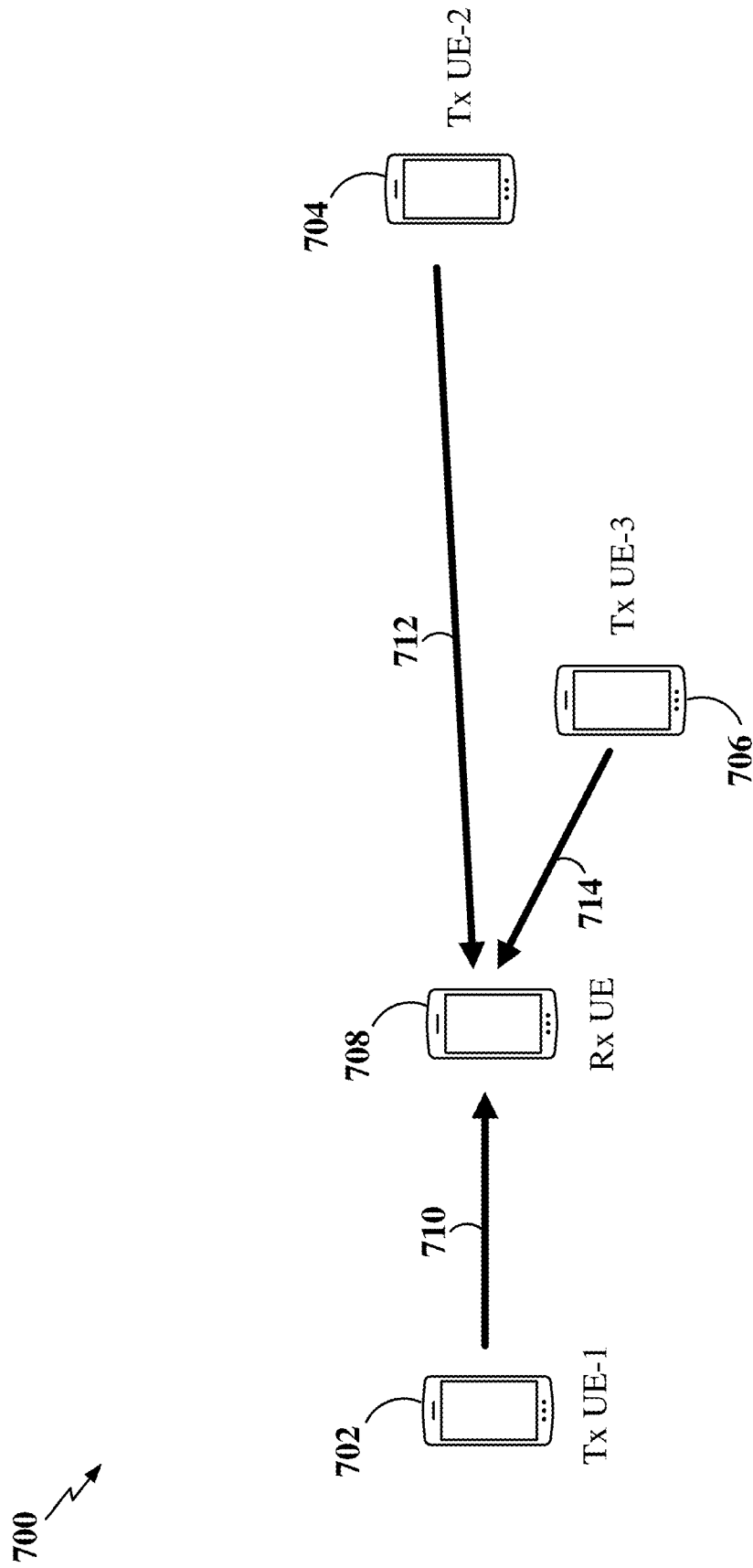
FIG. 7 illustrates a V2X scenario where transmissions to a receiver are not power controlled.

FIG. 7 illustrates a V2X scenario 700 where transmissions to a receiver are not power controlled. In FIG. 7, a first transmitting UE 702, a second transmitting UE 704, and a third transmitting UE 706 all transmit to a receiving UE 708. In an example, a first transmission 710 from the first transmitting UE 702 and a second transmission 712 from the second transmitting UE 704 may potentially be separated with SIC at the receiving UE 708. However, orthogonal/low correlation signatures may be needed to separate the first transmission 710 from the first UE 702 and a third transmission 714 from the third UE 706 if such transmissions cannot be separated with SIC at the receiving UE 708.

In an aspect of the disclosure, to improve transmission reliability with increasing user densities, MA signatures may be used for control transmissions to make a control transmission more reliable even when collisions are detected. For example, a NACK-based reselection scheme is provided to reselect a resource in case a collision is detected. In an aspect, a request (REQ)-response (RSP) based design is provided that allows for a NOMA/MA signature spread REQ and RSP for detecting collisions during the REQ phase.

Figure 8:
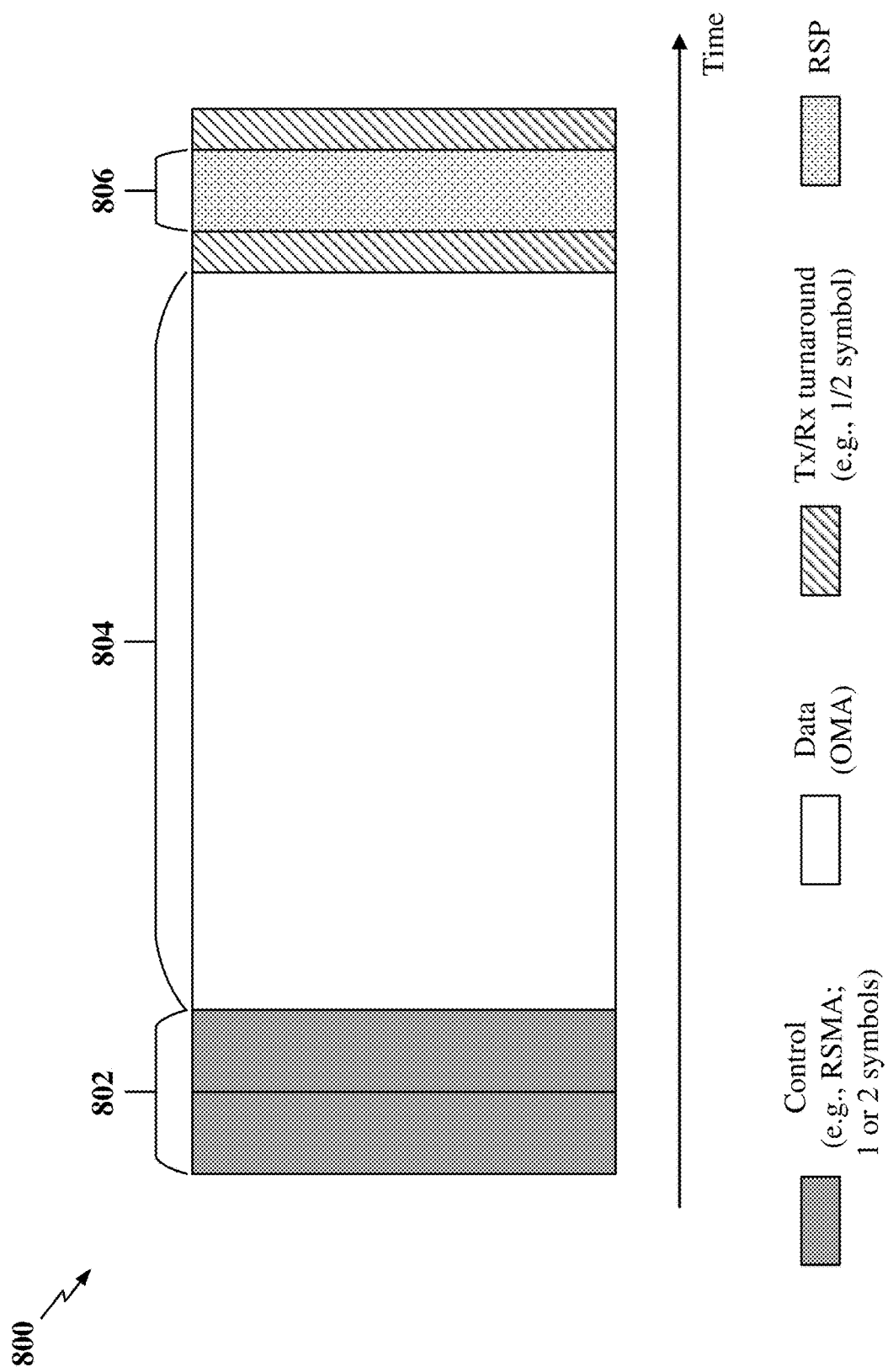
FIG. 8 illustrates an example TTI structure for a REQ-RSP based channel access design according to an aspect of the present disclosure.

FIG. 8 illustrates an example TTI structure 800 for a REQ-RSP based channel access design according to an aspect of the present disclosure.

The TTI structure 800 may include a first region 802 for communicating control information over, e.g., 1 or 2 symbols. In an aspect, the control information includes a transmission request (REQ). That is, the first region 802 carries information related to the REQ instead of only a sequence. The first region 802 is followed by a second region 804 for communicating orthogonal multiple access (OMA) data over a number of symbols. A third region 806 for communicating a response (RSP) to the REQ may follow the second region 804. Notably, a Tx/Rx turnaround region (e.g., 1/2 symbol in length) may precede and follow the third region 806. In an aspect, the RSP may be in the form of ACK/NACK or information indicating that a transmitter should reselect a resource for the transmission of data. In an aspect, the TTI structure 800 for the REQ-RSP based transmission design, wherein the control information (REQ) is transmitted followed by the transmission of the OMA data and then the RSP, reduces overhead in comparison to a transmission design that transmits a REQ followed by a transmission of a RSP, control information, and data in a TTI.

In an aspect, the REQ-RSP based transmission design of FIG. 8 may be implemented with or without LBT symbols. When implemented without LBT symbols, control information may be transmitted in the first region 802 with MA signatures (e.g., RSMA or SCMA). A MA signature length (e.g., repetition factor for RSMA) may be configured for a channel bandwidth/resource pool since the MA signature length depends on a QoS versus density needs. Moreover, the MA signature length can be dynamically modified based on UE measurements of congestion, etc. Notably, a baseline of OMA control information and data may still be supported based on configuration (with LBT symbols).

In an aspect, when the control information is transmitted with MA signatures (e.g., RSMA), reference symbols (RS) for the control information are orthogonal. The RS may be used to determine a start/stop of resource allocation. Notably, in a previous scheme, the start/stop of resource allocation may have been determined based on different LBT sequences.

In an aspect, a number of orthogonal RS dimensions needed for transmission may be determined as follows. For example, a number of orthogonal RS dimensions needed may be equal to N×4, where N is the number of UEs that can be multiplexed in the channel bandwidth/resource pool. The number of UEs that can be multiplexed may determine a collision probability. Therefore, a higher value of N may be needed for higher QoS and higher densities.

If N=1, then the number of orthogonal RS dimensions needed is equal to N×4=1×4=4. Thus, a transmitter transmitting OMA control information and data may rely on random selection alone for reduced collisions. Notably, this is the same as a baseline design with a LBT-based mechanism.

If N=2, then the number of orthogonal RS dimensions needed is equal to N×4=2×4=8. If N=4, then the number of orthogonal RS dimensions needed is equal to N×4=4×4=16. If N=8, then the number of orthogonal RS dimensions needed is equal to N×8=8×4=32. Beyond 32 orthogonal RS dimensions may be difficult to attain but low correlation may still be achieved with different sequences.

Figure 9:
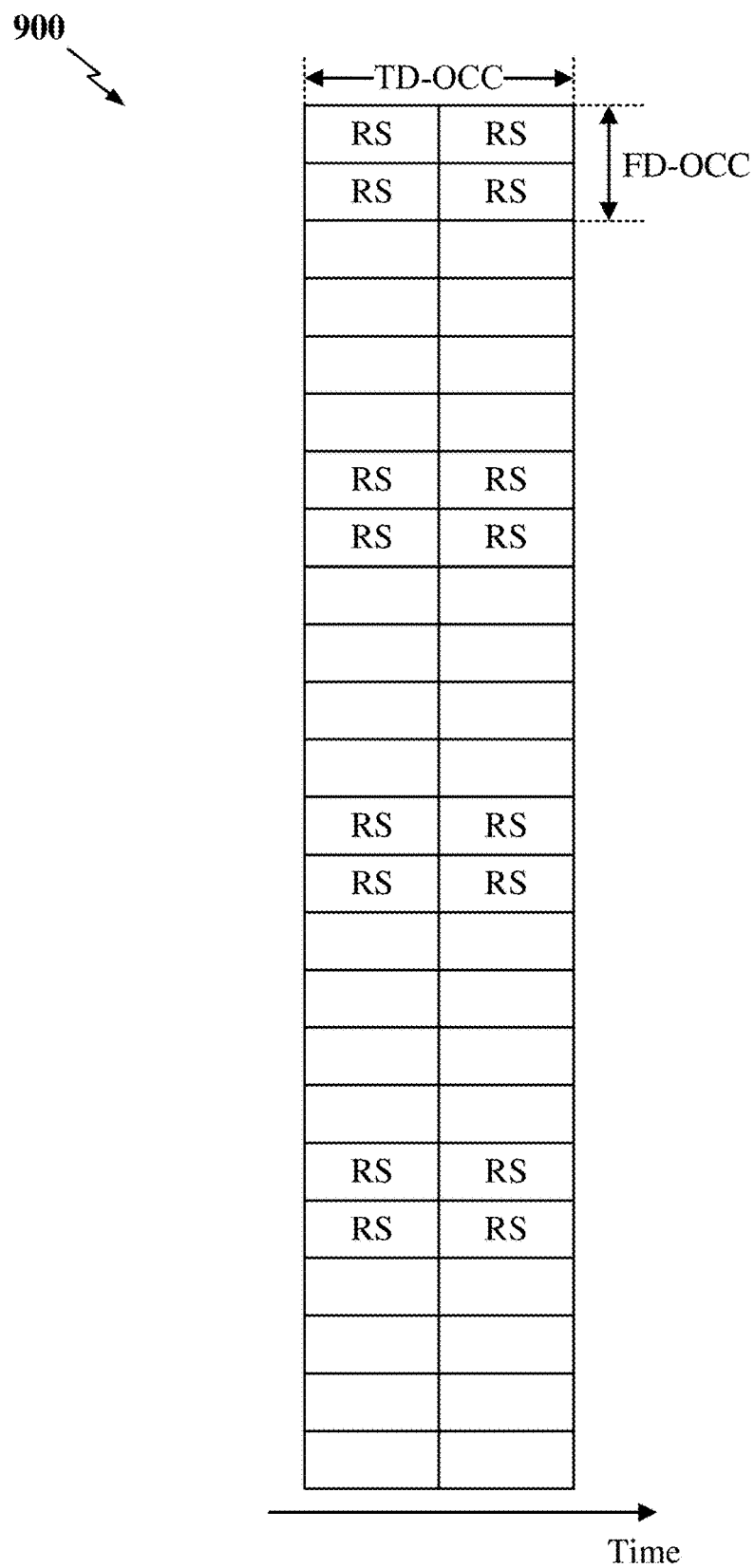
FIG. 9 illustrates an example resource structure for control symbols having reference symbols (RS) according to an aspect of the present disclosure.

FIG. 9 illustrates an example resource structure 900 for control symbols having reference symbols (RS) according to an aspect of the present disclosure. Referring to FIG. 9, methods for attaining a number of orthogonal RS dimensions will be described.

The number of orthogonal RS dimensions may be attained using one or two root sequences. Moreover, the number of attainable RS dimensions may be a product of a maximum number of cyclic shifts, a time domain orthogonal cover code (TD-OCC), a frequency domain orthogonal cover code (FD-OCC), and the number of roots sequences. In one example, if the maximum number of cyclic shifts is 4, TD-OCC is 2, FD-OCC is 2, and the number of root sequences is 1, then the number of attainable RS dimensions=4×2×2×1=16. In another example, if the maximum number of cyclic shifts is 4, TD-OCC is 2, FD-OCC is 2, and the number of root sequences is 2, then the number of attainable RS dimensions=4×2×2×1=32.

In an aspect, a MA sequence may be applied to have subchannel-based spreading/interleaving. This is appropriate since two UEs may overlap only in a subset of subchannels.

In an aspect, a MA sequence may be configured for a channel bandwidth/resource pool according to a MA signature length, a number of control symbols, a number of cyclic shifts, a number of TD-OCC, a number of FD-OCC, and a number of root sequences. In an example, the MA signature length is 4, the number of control symbols is 2, the number of cyclic shifts is 4, the number of TD-OCC is 2, the number of FD-OCC is 2, and the number of root sequences is 1. This results in a multiplexing factor of 4 with 16 orthogonal RS for control decoding and allocation size detection.

Figure 10:
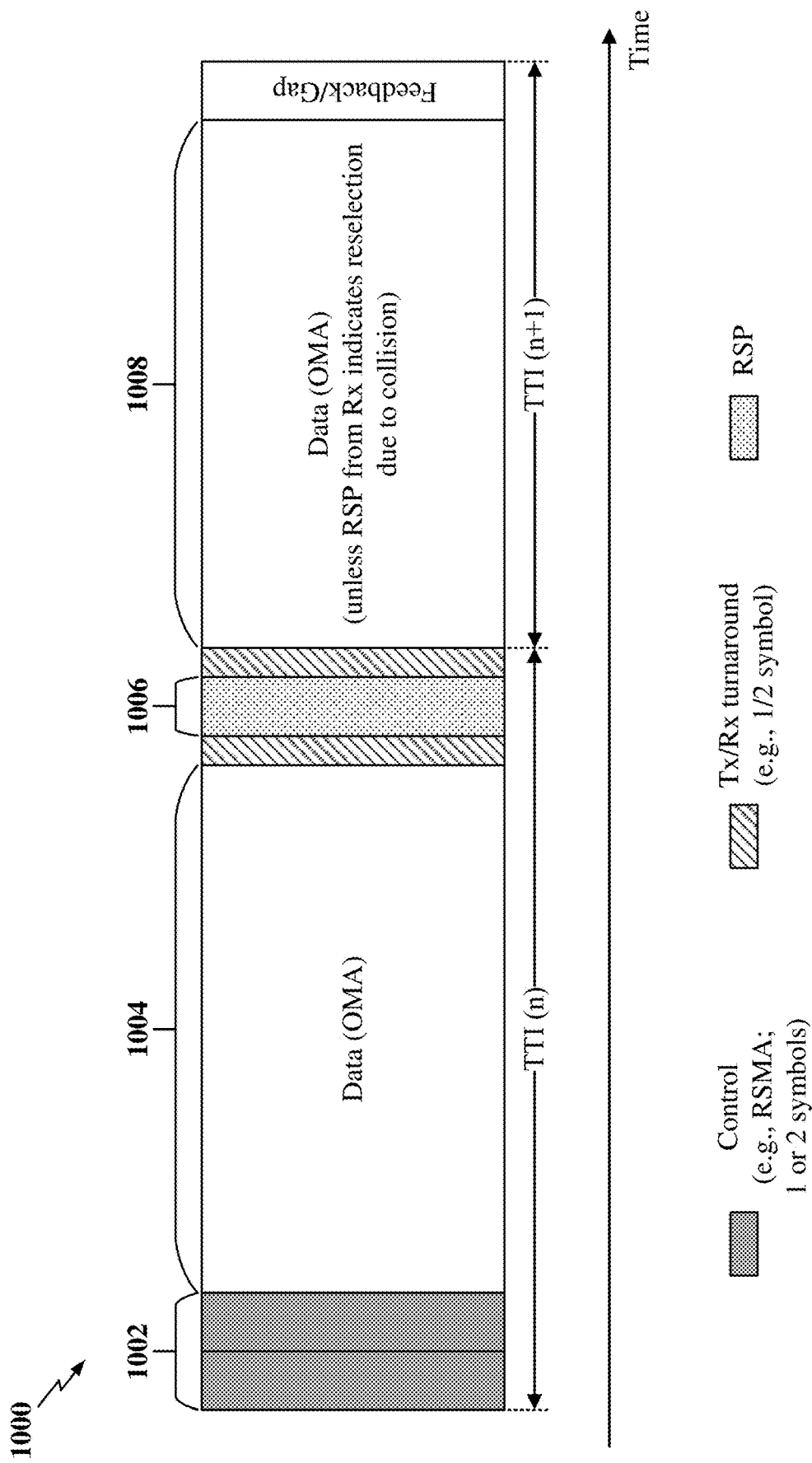
FIG. 10 illustrates an example TTI structure for a REQ-RSP based channel access design according to an aspect of the present disclosure.

FIG. 10 illustrates an example TTI structure 1000 for a REQ-RSP based channel access design according to an aspect of the present disclosure.

The TTI structure 1000 may include a first TTI (TTI(n)) having a first region 1002 for communicating control information over 1 or 2 symbols. In an aspect, the control information includes a transmission request (REQ). The first region 1002 is followed by a second region 1004 for communicating orthogonal multiple access (OMA) data over a number of symbols. A third region 1006 for communicating a response (RSP) to the REQ may follow the second region 1004. Notably, a Tx/Rx turnaround region (e.g., 1/2 symbol in length) may precede and follow the third region 1006. The RSP may be in the form of ACK/NACK or information indicating that a transmitter should reselect a resource for the transmission of data. The TTI structure 1000 may also include a second TTI (TTI(n+1)) having a fourth region 1008 for communicating OMA data. However, if the RSP communicated during the previous TTI (e.g., third region 1006 of TTI(n)) indicates that the transmitter should reselect a resource (e.g., due to a collision) for transmission, the OMA data will not be transmitted in the fourth region 1008.

In an aspect, when control information is transmitted with MA signatures, a receiving UE may decode multiple control information from multiple transmitting UEs and determine whether data corresponding to the multiple control information will collide. The receiving UE may estimate a signal-to-interference-plus-noise ratio (SINR) of the data of interest based on RS. Notably, a one-to-one correspondence may exist between a data RS sequence and a MA signature used for control information. Thus, SINR in a data portion can be estimated per UE. The receiving UE may determine whether or not the data can be decoded based on an estimated SINR for the data (on RS REs).

Referring to FIG. 10, the receiving UE transmits the RSP (in the third region 1006) to the transmitting UE to indicate whether the transmitting UE is to continue transmission of data or reselect a resource for transmission due to collision. Priority information, included in the control information transmitted in the first region 1002 or based on a MA signature, is used to determine which transmitting UE should yield. In an aspect, the RSP transmitted to a particular transmitting UE is transmitted with the same MA signature used by the particular transmitting UE to transmit the control information (REQ) to the receiving UE. The RSP may be transmitted using a system frame number (SFN). In an aspect, the receiving UE may transmit the RSP to two or more transmitting UEs. For example, the receiving UE may inform one transmitting UE to continue data transmission while informing another transmitting UE to reselect a resource for transmission. In another aspect, a transmitting UE may detect the RSP from a previous TTI to determine whether or not a next TTI is available for transmission. Accordingly, the RSP may provide receiver-side protection.

Figure 11:
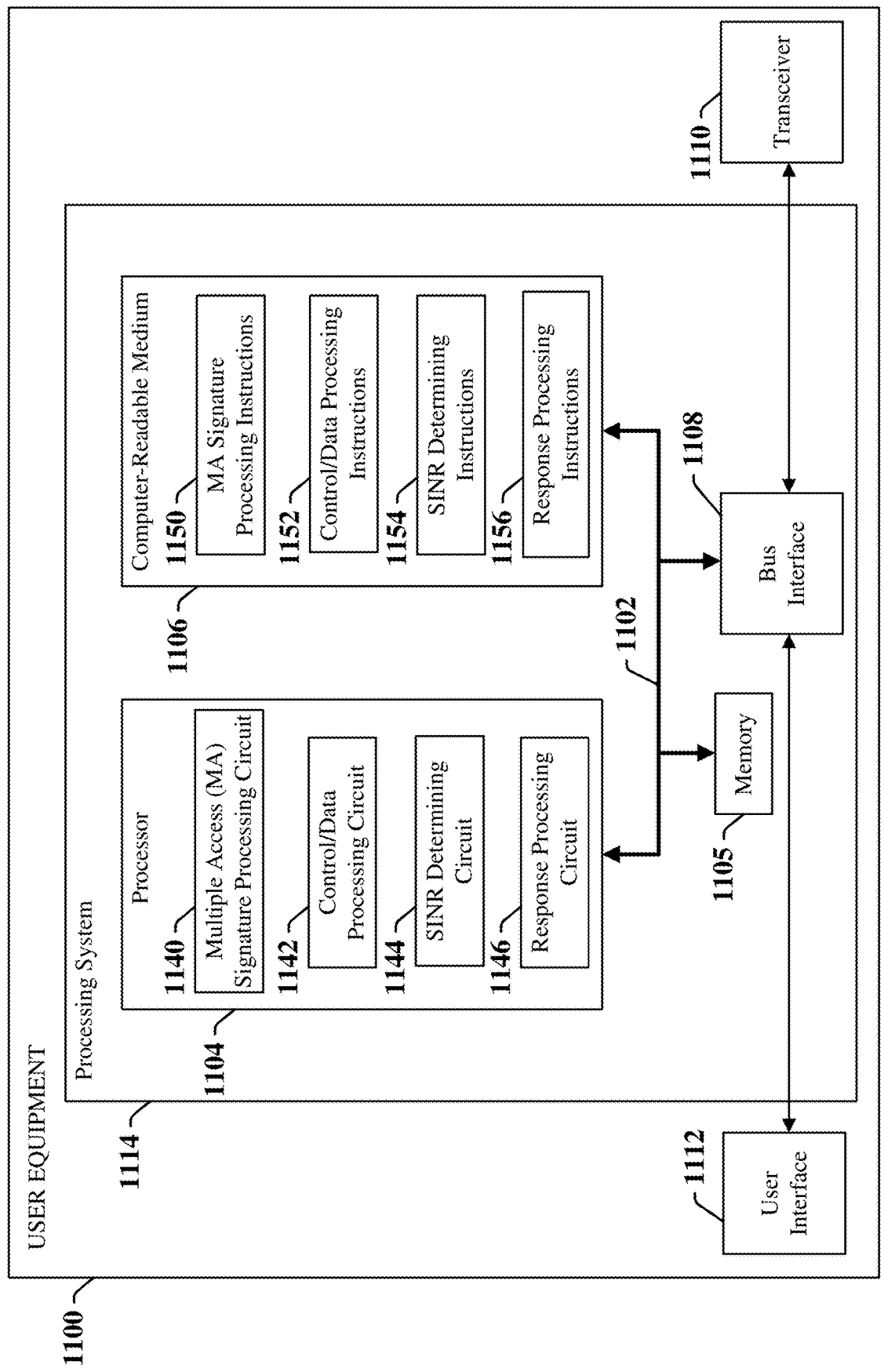
FIG. 11 is a block diagram illustrating an example of a hardware implementation for a user equipment according to some aspects of the present disclosure.

FIG. 11 is a block diagram illustrating an example of a hardware implementation for a user equipment (UE) 1100 employing a processing system 1114. For example, the UE 1100 may be a UE as illustrated in any one or more of FIGS. 1 and/or 2.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described below and illustrated in FIGS. 12 and 13.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include multiple access (MA) signature processing circuitry 1140 configured for various functions, including, for example, determining a multiple access (MA) signature for distinguishing a transmission of the transmitting device from another transmission of another transmitting device on a same frequency resource. For example, the MA signature processing circuitry 1140 may be configured to implement one or more of the functions described below in relation to FIG. 12, including, e.g., block 1202. The processor may also include control/data processing circuitry 1142 configured for various functions, including, for example, transmitting sidelink control information using the MA signature on a first set of frequency resources, the sidelink control information corresponding to first data information, transmitting the first data information on the first set of frequency resources, determining second data information and a second set of frequency resources based on a response received from a receiving device, and transmitting the second data information on the second set of frequency resources. For example, the control/data processing circuitry 1142 may be configured to implement one or more of the functions described below in relation to FIG. 12, including, e.g., blocks 1204, 1206, 1210, and 1212. The processor 1104 may also include response processing circuitry 1146 configured for various functions, including, for example, receiving, from the receiving device, a response indicating whether reception of the first data information was successful. For example, the response processing circuitry 1146 may be configured to implement one or more of the functions described below in relation to FIG. 12, including, e.g., block 1208.

In an aspect, the MA signature processing circuitry 1140 may also be configured for detecting a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource. For example, the MA signature processing circuitry 1140 may be configured to implement one or more of the functions described below in relation to FIG. 13, including, e.g., block 1304. In an aspect, the control/data processing circuitry 1142 may be configured for receiving one or more sidelink control information on a first set of frequency resources from one or more transmitting devices, receiving, or attempting to receive, the first data information on the first set of frequency resources, and receiving second data information on a second set of frequency resources. For example, the control/data processing circuitry 1142 may be configured to implement one or more of the functions described below in relation to FIG. 13, including, e.g., blocks 1302 and 1312.

The processor 1104 may also include SINR determining circuitry 1144 configured for various functions, including, for example, determining, for the detected MA signature, a signal-to-interference-plus-noise ratio (SINR) of the first data information associated with the corresponding sidelink control information and determining a likelihood of successfully receiving the first data information based on the determined SINR. For example, the SINR determining circuitry 1144 may be configured to implement one or more of the functions described below in relation to FIG. 13, including, e.g., blocks 1306 and 1308. In an aspect, the response processing circuitry 1146 may also be configured for transmitting a response to the transmitting device based on the likelihood, wherein the response indicates whether reception of the first data information is successful. For example, the response processing circuitry 1146 may be configured to implement one or more of the functions described below in relation to FIG. 13, including, e.g., block 1310.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus or means. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include multiple access (MA) signature processing instructions 1150, control/data processing instructions 1152, SINR determining instructions 1154, and response processing instructions 1156 configured for various functions. For example, the MA signature processing instructions 1150 may be configured to implement one or more of the functions described in relation to FIG. 12, including, e.g., block 1202 and FIG. 13, including, e.g., block 1304. The control/data processing instructions 1152 may be configured to implement one or more of the functions described in relation to FIG. 12, including, e.g., blocks 1204, 1206, 1210, and 1212 and FIG. 13, including, e.g., blocks 1302 and 1312. The SINR determining instructions 1154 may be configured to implement one or more of the functions described in relation to FIG. 13, including, e.g., blocks 1306 and 1308. The response processing instructions 1156 may be configured to implement one or more of the functions described in relation to FIG. 12, including, e.g., block 1208 and FIG. 13, including, e.g., block 1310.

Figure 12:
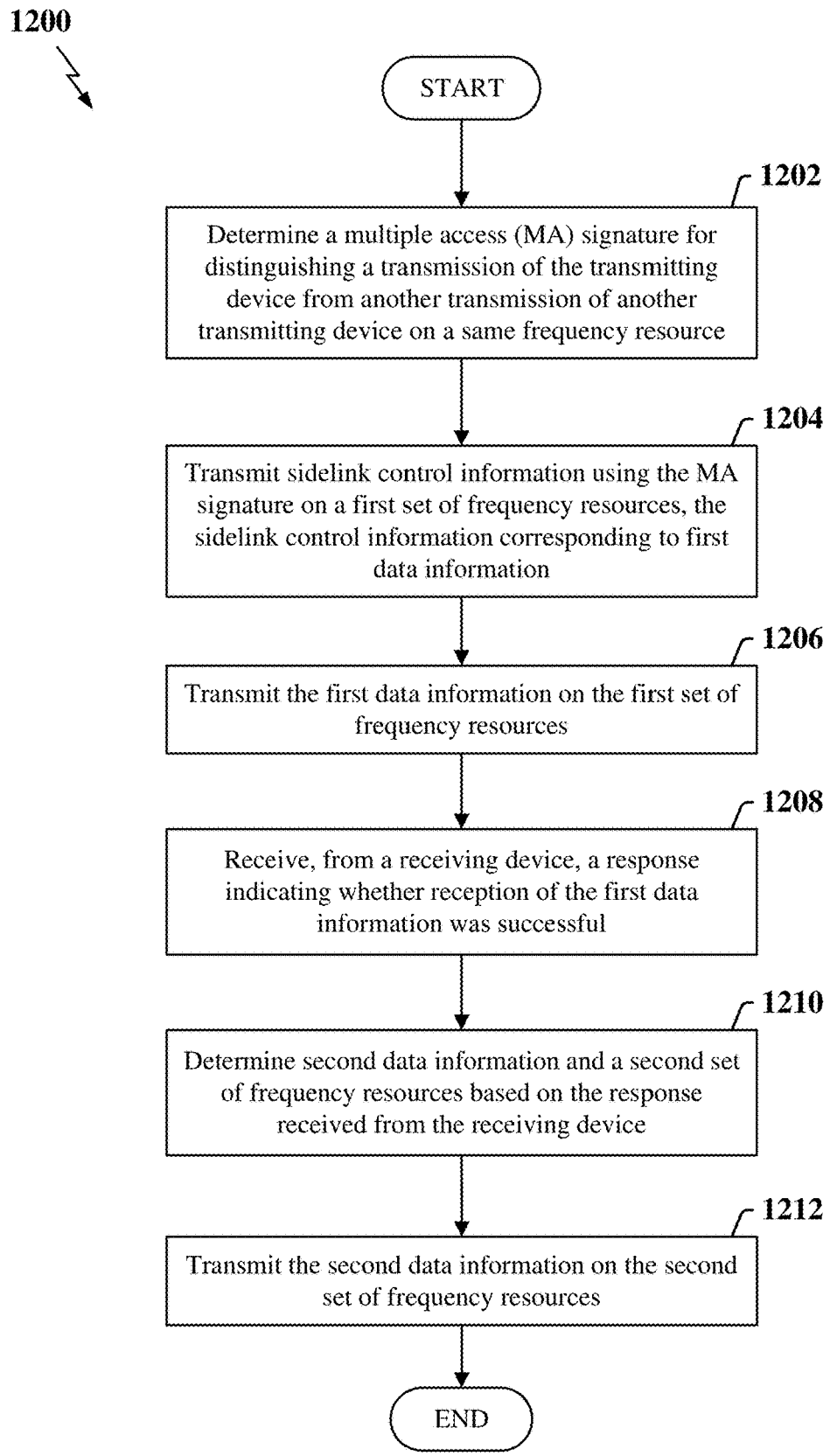
FIG. 12 is a flow chart illustrating an exemplary process for channel access at a transmitting device in accordance with some aspects of the present disclosure.

FIG. 12 is a flow chart illustrating an exemplary process 1200 for channel access at a transmitting device in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the UE 1100 illustrated in FIG. 11. In some examples, the process 1200 may be carried out by any suitable apparatus or means for carrying out the functions or algorithm described below.

At block 1202, the transmitting device determines a multiple access (MA) signature for distinguishing a transmission of the transmitting device from another transmission of another transmitting device on a same frequency resource.

At block 1204, the transmitting device transmits sidelink control information using the MA signature on a first set of frequency resources. The sidelink control information corresponds to first data information. In an aspect, when transmitting the sidelink control information, the transmitting device also determines a length of the MA signature and/or a number of reference symbols to use for transmitting the sidelink control information. The transmitting device may determine such information via reception of a radio resource control (RRC) configuration message. In another aspect, when transmitting the sidelink control information, the transmitting device also determines a reference symbol (RS) sequence, and determines the first set of frequency resources to use for transmitting the RS sequence based on the MA signature. In a further aspect, when transmitting the sidelink control information, the transmitting device may also determine a sequence identifier, a time domain orthogonal cover code (TD-OCC), a frequency domain orthogonal cover code (FD-OCC), and/or a cyclic shift to use for transmitting the sidelink control information. Such information may be determined via reception of a RRC configuration message.

In an aspect, the RS sequence is used to demodulate the sidelink control information at a receiving device. The RS sequence is also used to measure a signal-to-interference-plus-noise ratio (SINR) of the first data information at the receiving device. The RS sequence may be determined based on the MA signature.

At block 1206, the transmitting device transmits the first data information on the first set of frequency resources. At block 1208, the transmitting device receives, from the receiving device, a response indicating whether reception of the first data information was successful. In an aspect, the response is based on the actual/successful decoding or the likelihood of successful decoding of the first data information at the receiving device.

In an aspect, the response is based on a signal-to-interference-plus-noise ratio (SINR) detected on the first set of frequency resources used to transmit the first data information. In an aspect, when receiving the response, the transmitting device may receive a negative acknowledgement (NACK) if reception was not successful and receive no response transmission if reception was successful. In another aspect, when receiving the response, the transmitting device may receive the NACK if reception was not successful and receive an acknowledgement (ACK) if reception was successful. In a further aspect, when receiving the response, the transmitting device may receive an indication to reselect a different set of frequency resources for transmitting data if reception was not successful and receive an indication to continue using the first set of frequency resources for transmitting data if reception was successful.

At block 1210, the transmitting device determines second data information and a second set of frequency resources based on the response received from the receiving device. At block 1212, the transmitting device transmits the second data information on the second set of frequency resources. In an aspect, if the response received from the receiving device is the NACK, then the second data information is the same as the first data information. In another aspect, if the response received from the receiving device is the ACK or no response transmission is received, then the second data information is different from the first data information and the second set of frequency resources is the same as the first set of frequency resources. In a further aspect, the response is received in a transmission time interval (TTI). Accordingly, the transmitting device may further determine whether a next TTI is available for transmission based on the response received in the TTI.

In one configuration, the apparatus 1100 for wireless communication includes means for determining a multiple access (MA) signature for distinguishing a transmission of the transmitting device from another transmission of another transmitting device on a same frequency resource, means for transmitting sidelink control information using the MA signature on a first set of frequency resources, the sidelink control information corresponding to first data information, means for transmitting the first data information on the first set of frequency resources, means for receiving, from a receiving device, a response indicating whether reception of the first data information was successful, means for determining second data information and a second set of frequency resources based on the response received from the receiving device, means for transmitting the second data information on the second set of frequency resources, and means for determining whether a next TTI is available for transmission based on the response received in a TTI. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and/or 2, and utilizing, for example, the processes and/or algorithms described herein in relation to FIG. 12.

Figure 13:
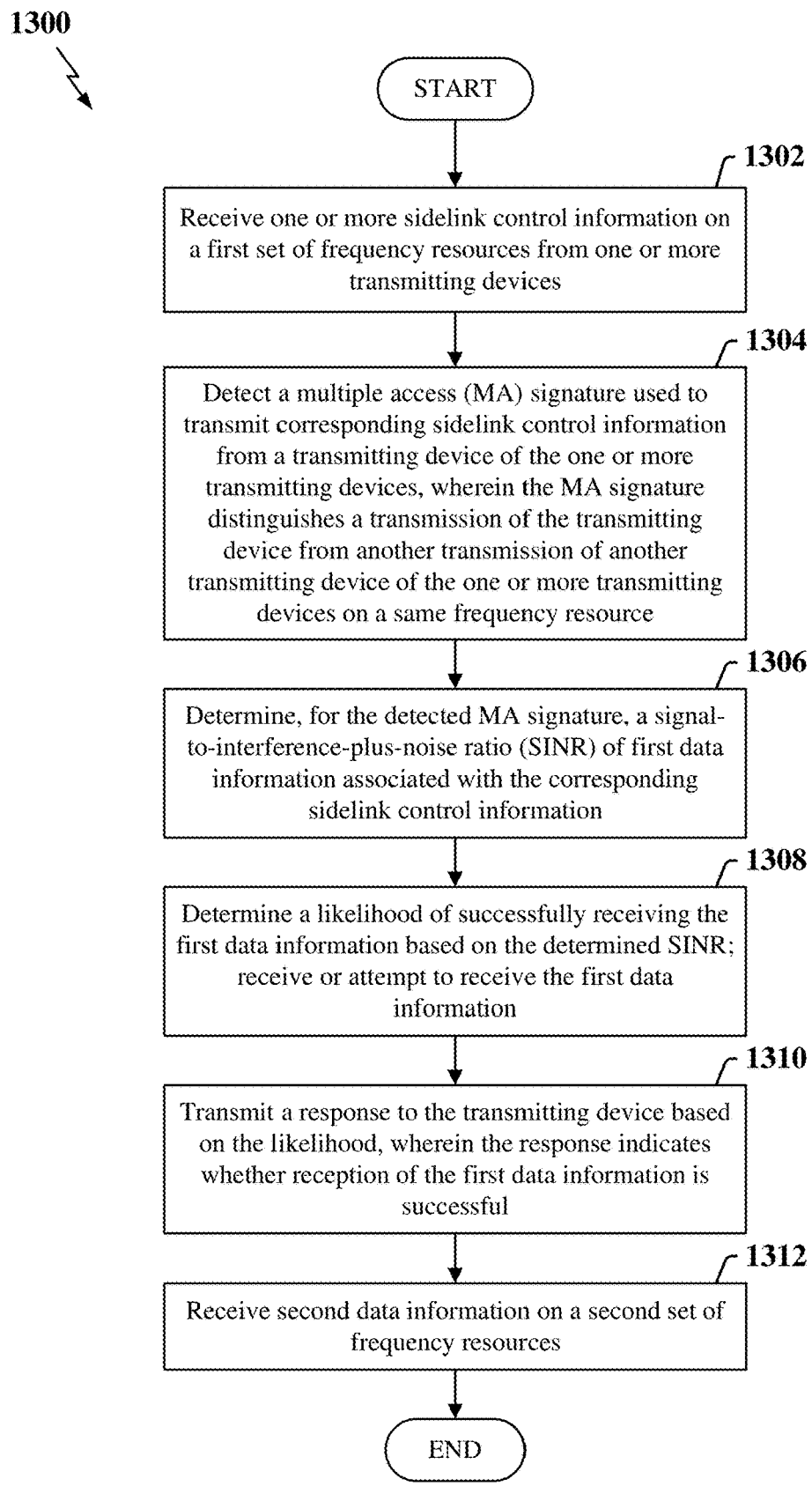
FIG. 13 is a flow chart illustrating an exemplary process for channel access at a receiving device in accordance with some aspects of the present disclosure.

FIG. 13 is a flow chart illustrating an exemplary process 1300 for channel access at a receiving device in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the UE 1100 illustrated in FIG. 11. In some examples, the process 1300 may be carried out by any suitable apparatus or means for carrying out the functions or algorithm described below.

At block 1302, the receiving device receives one or more sidelink control information on a first set of frequency resources from one or more transmitting devices. At block 1304, the receiving device detects a multiple access (MA) signature used to transmit corresponding sidelink control information from a transmitting device of the one or more transmitting devices. In an aspect, the MA signature distinguishes a transmission of the transmitting device from another transmission of another transmitting device of the one or more transmitting devices on a same frequency resource.

At block 1306, the receiving device determines, for the detected MA signature, a signal-to-interference-plus-noise ratio (SINR) of first data information associated with the corresponding sidelink control information. In an aspect, when determining the SINR, the receiving device may also determine a reference symbol (RS) sequence used to transmit the corresponding sidelink control information. The RS sequence is determined based on the MA signature. The SINR is determined based on the RS sequence. Moreover, the receiving device may demodulate the corresponding sidelink control information using the RS sequence.

At block 1308, the receiving device determines a likelihood of successfully receiving the first data information based on the determined SINR. Thereafter, the receiving device may receive, or attempt to receive, the first data information on the first set of frequency resources.

At block 1310, the receiving device transmits a response to the transmitting device based on the likelihood, wherein the response indicates whether reception of the first data information is successful. In an aspect, when transmitting the response, the receiving device transmits a negative acknowledgement (NACK) if reception was not successful and refrains from transmitting the response if reception was successful. In another aspect, when transmitting the response, the receiving device transmits the NACK if reception was not successful and transmits an acknowledgement (ACK) if reception was successful. In a further aspect, when transmitting the response, the receiving device transmits an indication to reselect a different set of frequency resources for transmitting data if reception was not successful and transmits an indication to continue using the first set of frequency resources for transmitting data if reception was successful.

At block 1312, the receiving device receives second data information on a second set of frequency resources. In an aspect, if the response transmitted to the transmitting device is the NACK, then the second data information is the same as the first data information. In a further aspect, if the response transmitted to the transmitting device is the ACK or if no response transmission is transmitted, then the second data information is different from the first data information and the second set of frequency resources is the same as the first set of frequency resources.

In one configuration, the apparatus 1100 for wireless communication includes means for receiving one or more sidelink control information on a first set of frequency resources from one or more transmitting devices, means for detecting a multiple access (MA) signature used to transmit corresponding sidelink control information from a transmitting device of the one or more transmitting devices, wherein the MA signature distinguishes a transmission of the transmitting device from another transmission of another transmitting device of the one or more transmitting devices on a same frequency resource, means for determining, for the detected MA signature, a signal-to-interference-plus-noise ratio (SINR) of first data information associated with the corresponding sidelink control information, means for determining a likelihood of successfully receiving the first data information based on the determined SINR, means for transmitting a response to the transmitting device based on the likelihood, wherein the response indicates whether reception of the first data information is successful, means for determining a reference symbol (RS) sequence used to transmit the corresponding sidelink control information, wherein the SINR is determined based on the RS sequence, means for demodulating the corresponding sidelink control information using the RS sequence, means for receiving, or attempting to receive, the first data information on the first set of frequency resources, and means for receiving second data information on a second set of frequency resources. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and/or 2, and utilizing, for example, the processes and/or algorithms described herein in relation to FIG. 13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a transmitting device, comprising:
   determining a multiple access (MA) signature for distinguishing a sidelink control information transmission of the transmitting device from another sidelink control information transmission of another transmitting device on a same frequency resource;

transmitting sidelink control information using the MA signature on a first set of frequency resources, the sidelink control information corresponding to first data information;

transmitting the first data information on the first set of frequency resources; and receiving, from a receiving device, a response indicating whether reception of the first data information was successful.

2. The method of claim 1, wherein the response is based on a signal-to-interference-plus-noise ratio (SINR) detected on the first set of frequency resources used to transmit the first data information.

3. The method of claim 1, wherein the receiving the response comprises at least one of:

receiving a negative acknowledgement (NACK) if reception was not successful and receiving no response transmission if reception was successful;

receiving the NACK if reception was not successful and receiving an acknowledgement (ACK) if reception was successful; or receiving an indication to reselect a different set of frequency resources for transmitting data if reception was not successful and receiving an indication to continue using the first set of frequency resources for transmitting data if reception was successful.

4. The method of claim 3, further comprising:

determining second data information and a second set of frequency resources based on the response received from the receiving device; and transmitting the second data information on the second set of frequency resources.

5. The method of claim 4, wherein:

when the response received from the receiving device is the NACK, the second data information is the same as the first data information; and when the response received from the receiving device is the ACK or no response transmission is received, the second data information is different from the first data information and the second set of frequency resources is the same as the first set of frequency resources.

6. The method of claim 1, wherein the transmitting the sidelink control information comprises determining at least one of a length of the MA signature or a number of reference symbols to use for transmitting the sidelink control information.

7. The method of claim 1, wherein the transmitting the sidelink control information comprises determining at least one of a sequence identifier, a time domain orthogonal cover code (TD-OCC), a frequency domain orthogonal cover code (FD-OCC), or a cyclic shift to use for transmitting the sidelink control information.

8. The method of claim 1, wherein the transmitting the sidelink control information comprises:

determining a reference symbol (RS) sequence; and determining the first set of frequency resources to use for transmitting the RS sequence based on the MA signature.

9. The method of claim 8, wherein the sidelink control information is demodulated using the RS sequence at the receiving device.

10. The method of claim 8, wherein a signal-to-interference-plus-noise ratio (SINR) of the first data information is measured using the RS sequence at the receiving device.

11. The method of claim 8, wherein the determining the RS sequence comprises determining the RS sequence based on the MA signature.

12. The method of claim 1, wherein the receiving the response comprises:

receiving the response in a transmission time interval (TTI); and determining whether a next TTI is available for transmission based on the response received in the TTI.

13. A transmitting device for wireless communication, comprising:

means for determining a multiple access (MA) signature for distinguishing a sidelink control information transmission of the transmitting device from another sidelink control information transmission of another transmitting device on a same frequency resource;

means for transmitting sidelink control information using the MA signature on a first set of frequency resources, the sidelink control information corresponding to first data information;

means for transmitting the first data information on the first set of frequency resources; and means for receiving, from a receiving device, a response indicating whether reception of the first data information was successful.

14. The transmitting device of claim 13, wherein the response is based on a signal-to-interference-plus-noise ratio (SINR) detected on the first set of frequency resources used to transmit the first data information.

15. The transmitting device of claim 13, wherein the means for receiving the response is configured to at least one of:

receive a negative acknowledgement (NACK) if reception was not successful and receive no response transmission if reception was successful;

receive the NACK if reception was not successful and receive an acknowledgement (ACK) if reception was successful; or receive an indication to reselect a different set of frequency resources for transmitting data if reception was not successful and receive an indication to continue using the first set of frequency resources for transmitting data if reception was successful.

16. The transmitting device of claim 15, further comprising:

means for determining second data information and a second set of frequency resources based on the response received from the receiving device; and means for transmitting the second data information on the second set of frequency resources.

17. The transmitting device of claim 16, wherein:

when the response received from the receiving device is the NACK, the second data information is the same as the first data information; and when the response received from the receiving device is the ACK or no response transmission is received, the second data information is different from the first data information and the second set of frequency resources is the same as the first set of frequency resources.

18. A method of wireless communication at a receiving device, comprising:

receiving one or more sidelink control information on a first set of frequency resources from one or more transmitting devices;

detecting a multiple access (MA) signature used to transmit corresponding sidelink control information from a transmitting device of the one or more transmitting devices, wherein the MA signature distinguishes a sidelink control information transmission of the transmitting device from another sidelink control information transmission of another transmitting device of the one or more transmitting devices on a same frequency resource;

determining, for the detected MA signature, a signal-to-interference-plus-noise ratio (SINR) of first data information associated with the corresponding sidelink control information;

determining a likelihood of successfully receiving the first data information based on the determined SINR; and transmitting a response to the transmitting device based on the likelihood, wherein the response indicates whether reception of the first data information is successful.

19. The method of claim 18, wherein the determining the SINR comprises determining a reference symbol (RS) sequence used to transmit the corresponding sidelink control information, wherein the SINR is determined based on the RS sequence.

20. The method of claim 19, wherein the determining the SINR comprises demodulating the corresponding sidelink control information using the RS sequence.

21. The method of claim 19, wherein the RS sequence is determined based on the MA signature.

22. The method of claim 18, further comprising attempting to receive the first data information on the first set of frequency resources.

23. The method of claim 22, wherein the transmitting the response comprises at least one of:
transmitting a negative acknowledgement (NACK) if reception was not successful and refraining from transmitting the response if reception was successful;
transmitting the NACK if reception was not successful and transmitting an acknowledgement (ACK) if reception was successful; or
transmitting an indication to reselect a different set of frequency resources for transmitting data if reception was not successful and transmitting an indication to continue using the first set of frequency resources for transmitting data if reception was successful.

24. The method of claim 23, further comprising receiving second data information on a second set of frequency resources.

25. The method of claim 24, wherein:
when the response transmitted to the transmitting device is the NACK, the second data information is the same as the first data information; and
when the response transmitted to the transmitting device is the ACK or no response transmission is transmitted, the second data information is different from the first data information and the second set of frequency resources is the same as the first set of frequency resources.

26. A receiving device for wireless communication, comprising:
means for receiving one or more sidelink control information on a first set of frequency resources from one or more transmitting devices;
means for detecting a multiple access (MA) signature used to transmit corresponding sidelink control information from a transmitting device of the one or more transmitting devices, wherein the MA signature distinguishes a sidelink control information transmission of the transmitting device from another sidelink control information transmission of another transmitting device of the one or more transmitting devices on a same frequency resource;
means for determining, for the detected MA signature, a signal-to-interference-plus-noise ratio (SINR) of first data information associated with the corresponding sidelink control information;
means for determining a likelihood of successfully receiving the first data information based on the determined SINR; and
means for transmitting a response to the transmitting device based on the likelihood, wherein the response indicates whether reception of the first data information is successful.

27. The receiving device of claim 26, wherein the means for receiving is configured to attempt to receive the first data information on the first set of frequency resources.

28. The receiving device of claim 27, wherein the means for transmitting the response is configured to at least one of:
transmit a negative acknowledgement (NACK) if reception was not successful and refrain from transmitting the response if reception was successful;
transmit the NACK if reception was not successful and transmit an acknowledgement (ACK) if reception was successful; or
transmit an indication to reselect a different set of frequency resources for transmitting data if reception was not successful and transmit an indication to continue using the first set of frequency resources for transmitting data if reception was successful.

29. The receiving device of claim 28, wherein the means for receiving is configured to receive second data information on a second set of frequency resources.

30. The receiving device of claim 29, wherein:
when the response transmitted to the transmitting device is the NACK, the second data information is the same as the first data information; and
when the response transmitted to the transmitting device is the ACK or no response transmission is transmitted, the second data information is different from the first data information and the second set of frequency resources is the same as the first set of frequency resources.

* * * * *